United States Patent [19]

McArthur

[11] 3,990,995

[45] *Nov. 9, 1976

[54] EXHAUST GAS CONVERSION CATALYST AND PROCESS

[75] Inventor: Dennis P. McArthur, Yorba Linda, Calif.

[73] Assignee: Union Oil Company of California, Los Angeles, Calif.

[ * ] Notice: The portion of the term of this patent subsequent to Dec. 24, 1991, has been disclaimed.

[22] Filed: Feb. 13, 1975

[21] Appl. No.: 549,515

Related U.S. Application Data

[62] Division of Ser. No. 341,864, March 16, 1973, abandoned.

[52] U.S. Cl. .............................. 252/432; 252/477 R; 423/213.5; 423/213.7
[51] Int. Cl.² ...................... B01J 21/04; B01J 21/02
[58] Field of Search.............. 423/212, 213.5, 213.7; 252/432, 477 R

[56] References Cited

UNITED STATES PATENTS 3,856,702  12/1974  McArthur ........................... 252/432

Primary Examiner—Patrick P. Garvin
Attorney, Agent, or Firm—Richard C. Hartman; Lannas S. Henderson; Dean Sandford

[57] ABSTRACT

Process and catalyst for the catalytic conversion of nitrogen oxides ($NO_x$), unburned hydrocarbons and carbon monoxide in internal combustion engine exhaust gases. The catalyst comprises rhodium as the essential active component, preferably composited with a nickel component. These catalysts are found to be exceptionally resistant to poisoning by sulfur and lead compounds present in the exhaust gases.

8 Claims, No Drawings

EXHAUST GAS CONVERSION CATALYST AND PROCESS

RELATED APPLICATION

This application is a division of Ser. No. 341,864, filed Mar. 16, 1973, now abandoned.

BACKGROUND AND SUMMARY OF INVENTION

Much effort has been devoted in recent years to the development of catalytic converters for removing air pollutants such as hydrocarbons, carbon monoxide and nitrogen oxides from engine exhaust gases. A general approach has been to provide a two-stage conversion system involving an initial contacting zone in which the raw exhaust gases are passed under reducing conditions over a suitable catalyst in the absence of added air, followed by a second zone in which oxidation of remaining CO and hydrocarbons is effected by adding to the first stage off-gases at least a stoichiometric proportion of air. Exemplary reactions which are believed to occur at least to some extent in the first conversion stage are as follows:

$$2 CO + 2NO \rightarrow N_2 + 2CO_2 \quad (1)$$

$$CO + H_2O \rightleftarrows CO_2 + H_2 \quad (2)$$

$$C_xH_y + xH_2O \rightleftarrows xCO + (y/2 + x)H_2 \quad (3)$$

$$2NO + 2H_2 \rightarrow N_2 + 2H_2O \quad (4)$$

$$2NO + 5H_2 \rightarrow 2NH_3 + 2H_2O \quad (5)$$

$$xNO + C_xH_y \rightarrow x/2\ N_2 + xCO + y/2\ H_2 \quad (6)$$

These reactions occur under what may be designated "net reducing" conditions, i.e., conditions wherein the mole ratio of oxygen to carbon monoxide and hydrocarbons is less than stoichiometric. Reactions 2 and 3 seldom go to completion, so that the off gases from the first stage nearly always comprise at least a near equilibrium proportion of carbon monoxide and hydrocarbons. It is hence necessary to provide a second oxidation stage with added air in order to complete the oxidation of carbon monoxide and hydrocarbons. The catalysts of this invention are useful in both stages of these systems, but are exceptionally active for nitrogen oxide ($NO_x$) conversion under net reducing conditions in the first stage. Moreover, at temperatures above about 900° F., they are very selective for converting $NO_x$ to elemental nitrogen (reactions 1, 4 and 6) rather than to ammonia (reaction 5). This is a decided advantage because any ammonia formed in the first stage is oxidized in the second stage back to NO which is then emitted to the atmosphere as a pollutant.

Several types of catalysts are known in the art which can achieve the desired activity and selectivity for $NO_x$ conversion if the exhaust gases are essentially free of sulfur and lead. However, activity is rapidly lost when one or both of these poisons is introduced into the exhaust gas. Different catalysts exhibit varying responses to each of these poisons. For example, base metal catalysts such as copper-nickel composites are only moderately affected by lead, but are drastically reduced in activity by sulfur and sulfur-lead combinations. Certain noble metals such as platinum and palladium are relatively unaffected by sulfur, but are poisoned significantly by lead, and drastically by lead-sulfur combinations. The search for an economical catalyst which is suitable resistant to both of these poisons has heretofore proven unfruitful.

I have now discovered however that, in sharp contrast to platinum and palladium catalysts, rhodium is remarkably resistant to deactivation by both sulfur and lead, or a combination of the two. Further, whereas platinum and palladium tend to deactivate at high temperatures due to metal agglomeration, rhodium is much less susceptible to this phenomenon and hence gives a more stable catalyst which is highly resistant to thermal deactivation. A fortuitous aspect of the invention is that the rhodium is found to be effective in very small proportions, as little as 0.005 weight-percent on a suitable inert support. Finally, rhodium has an advantage over another lead-resistant noble metal, ruthenium, in that the latter has a much greater propensity to form volatile oxides.

Although rhodium alone is highly active and fairly selective for $NO_x$ conversion to $N_2$, even greater selectivity is attained by providing an added nickel component, which may either be intimately composited with the rhodium component, or otherwise dispersed in the $NO_x$ conversion zone.

A particularly desirable support material for the active metal or metals is found to comprise certain crystalline aluminum borates.

DETAILED DESCRIPTION

The catalysts of this invention may be prepared by several different methods, in supported or unsupported form, and may take a variety of shapes, forms and sizes. By far the most practical type of catalyst however is the supported form, comprising a major proportion of a porous, thermally stable, inert support material such as carborundum, alpha alumina, delta alumina, mullite, aluminum phosphate, aluminum borate and the like, upon which is supported a minor proportion of the active metal or metals. Such catalysts may be prepared by conventional methods such as comulling the dry or moistened ingredients, followed by shaping the material into suitable granular or monolithic forms. Preferably however the support material is first shaped into the desired form, as by pelleting, extruding, prilling or the like, dried and preferably calcined, and then impregnated with suitable solutions of the desired metal salt or salts, either simultaneously or sequentially. The sequential method is preferred for the multi-component catalysts, with the nickel constituent being applied first, followed, after drying and calcining by impregnation with the desired rhodium salt. The impregnated support material is then dried and calcined to form the finished catalyst.

The rhodium content of the finished catalysts may range between about 0.005 and 0.2 percent, preferably about 0.01 – 0.15 percent by weight. The Ni content may range between about 1–20 percent, preferably about 4–15 percent by weight, as free metal. The weight-ratio of Ni/Rh should range between about 50 and 1500, preferably between about 100 and 500.

Where the support material is shaped into granular forms for impregnation, suitable sizes range between about one thirty-second and one-half inch, the preferred size depending primarily upon the macroporosity of the support, The impregnation technique may also be utilized for impregnating preformed monolithic honeycomb structures formed from the support material. An alternative monolith form can be composed of an inert, low surface area material such as alpha alumina or cordierite, upon which a thin layer of the desired high surface area support is deposited, as by coating the monolith with a slurry of the high-surface-area support material. This preformed composite monolith is then calcined and impregnated with solutions of the active metals.

It should not be concluded from the above that extremely high surface area supports are required herein. For the reactions and conditions prevailing in exhaust gas conversion, extremely high surface areas are not required; preferred supports may range in surface area between about 5–100 m$^2$/g.

For exhaust gas conversion catalysts, primary requirements for suitable supports are good mechanical strength, low bulk density, thermal and hydrothermal stability, shrink resistance, and chemical inertness. An ideal combination of these qualities has recently been found to inhere in a new class of crystalline aluminum borates described in my copending application Ser. No. 307,031, filed Nov. 16, 1972, now abandoned. These preferred crystalline aluminum borates are prepared by calcining an intimate admixture of alumina with boria, or a boria precursor such as boric acid at temperatures between about 1250° and 2600° F., preferably about 1450° – 2300° F. The proportion of boron compound employed should be adjusted to provide a finished catalyst support wherein the weight-ratio of $B_2O_3/Al_2O_3$ is between about 5/95 and 35/65, preferably between about 8/92 and 25/75. The overall severity of the calcination step should be controlled so as to produce a substantial, X-ray detectable phase of crystalline $9Al_2O_3 \cdot 2B_2O_3$. Usually a relatively minor phase, believed to be $2Al_2O_3 \cdot B_2O_3$, is also present.

The size of the aluminum borate crystallites produced in the final calcination is the primary parameter governing critical functional aspects of the support such as mechanical and thermal stability, porosity, pore size distribution and surface area. Calcination temperatures in the high ranges tend to produce large crystallites with resultant reduction in surface area and increase in average pore size. Conversely, the lower temperatures tend to give smaller crystallites, higher surface areas and smaller pores. For purposes of this invention, it is desirable to control the calcining so as to give a support having a surface area between about 5 – 100, preferably about 20 – 80 m$^2$/g, with a porosity of about 0.3 – 1.0, preferably 0.5 – 0.8 ml/g.

The preferred aluminum borate supports contain substantially no free boria. Free $B_2O_3$ melts at about 860° F. and develops a substantial vapor pressure at temperatures above about 1200° F. Hence, during calcination following the addition of active metal salts, and/or during subsequent use of the catalyst in exhaust gas converters, any free boria may become very mobile and active as liquid and/or vapor, and tends to combine with and deactivate the active metals. Also, if water is present, volatile metaboric acid may be formed which becomes corrosive to ferrous metals at elevated temperatures, as is molten $B_2O_3$ itself. In contrast to the hydrothermal instability of $B_2O_3$, the compounds $9Al_2O_3 \cdot 2B_2O_3$ and $2Al_2O_3 \cdot B_2O_3$ appear to be hydrothermally stable up to temperatures of at least about 3540° and 1895° F., respectively.

A number of effective methods have been developed for removing free boria from the catalyst supports, including primarily the following:

1. Calcination at temperatures above about 1800° F.
2. Steaming at temperatures above about 400° F.
3. Leaching with hot water at, e.g., 200°–400° F.
4. Leaching in 10–28 percent aqueous ammonia solutions at, e.g., 50°–120° F.
5. Any combination of the foregoing procedures.

Leaching with boiling water and/or with warm concentrated $NH_4OH$ solutions appear to be the most effective treatments.

Following calcination and (if desired) removal of free boria, the support may be impregnated in conventional manner with a solution or solutions of the desired metal salt or salts. Operative salts include the nitrates, chlorides, acetates, oxalates, sulfates and the like, the preferred salts being those whose anions are thermally decomposable to give the corresponding metal oxide and/or sulfide. Following impregnation, the catalyst is drained, dried and calcined in conventional manner at temperatures of e.g., 500° – 1500° F.

The finished catalysts produced as described are found to be highly active and selective for the conversion of $NO_x$ in exhaust gases derived from the combustion of fuels containing from 10–500 ppm of sulfur, and from about 0.01 – 4 grams of lead per gallon, and at gas hourly space velocities ranging between about 20,000 and 200,000 standard volumes per volume of catalyst per hour. Normally, acceptable activity and selectivity are maintained for upwards of 25,000 miles of average driving.

The following examples are cited to illustrate the invention, but are not to be construed as limiting in scope:

EXAMPLE I

Preparation of Catalyst Support

About 2800 grams of boehmite alumina was impregnated with about 4550 grams of orthoboric acid dissolved in sufficient water to provide about 95 percent saturation at 200° F., the impregnation being carried out at that temperature. The resulting hot slurry was then filtered to remove excess solution, washed with hot water, dried and calcined at 800° F. The resulting filter cake was then broken up and dry mulled for a short time, after which sufficient concentrated ammonium hydroxide was added to give an extrudable paste. The mixture was extruded through a one-eighth inch die at an extrusion pressure of about 800 psi, broken into extrudates of about one-eighth to one-fourth inch length, and dried at 250° F. for 1 hour. The dried extrudates were then heated from 200° to 1800° F. over a period of about 12 hours, and held at 1800° F. for 2 hours. Following this calcining step, the extrudates were washed in concentrated ammonium hydroxide for one hour, boiled in water for 1 hour to displace ammonia, and then boiled again for 1 hour. The product was then dried and calcined for 1 hour at 1200° F. The final product had a compacted bulk density of about 0.5 g/ml and had good mechanical strength. X-ray detectable phases of the 9:2 and the 2:1 crystalline aluminum borates were present.

EXAMPLES II–III

Preparation of Catalysts:

Catalyst No. 1 (Rh) was prepared by impregnating 50 ml of the calcined support from Example I with 60 ml of a solution consisting of 0.186g of rhodium chloride (40% Rh) dissolved in distilled water. The soak time was 2 minutes. The extrudates were then stripped of excess solution, air dried at room temperature for 1 hour and then oven dried at 110° C. for 1 hour.

Catalyst No. 2 (Rh-Ni) was prepared by impregnating 50 ml of the calcined support from Example I with an aqueous nickel nitrate solution. The soak time was 5 minutes. The concentration of the nickel nitrate solution was such as to yield a nickel loading corresponding to 8 weight-percent NiO upon calcination. The impregnated extrudates were then placed in a Buchner funnel where the excess solution was stripped away, and then air dried for 1 hour. The extrudates were then oven dried at 110° C. for 1 hour, air calcined at 1200° F. for 2 hours, and finally air calcined at 1500° F. for 2 hours. The calcined extrudates were then immersed in 60 ml of a solution consisting of 0.186 g of rhodium chloride (40% Rh) dissolved in distilled water and soaked for 2 minutes. The impregnated extrudates were stripped of excess solution, air dried for 30 minutes, and then oven dried at 110° C. for 1 hour.

Each of the foregoing catalysts contained about 0.1 weight-percent of Rh.

EXAMPLES IV-V

Activity Testing With Sulfur Present

The foregoing catalysts were tested for nitric oxide conversion activity and selectivity, using as the feed a synthetic exhaust gas having the following composition:

| | |
|---|---|
| $N_2$ | 74.1 % |
| $CO_2$ | 13.0 |
| $H_2O$ | 10.0 |
| CO | 1.0 |
| $C_3H_6$ | 0.1 |
| $O_2$ | 0.35 |
| $H_2$ | 0.33 |
| NO | 0.08 |
| $SO_2$ | 0.0045[2] |

[2]This amount of sulfur is approximately equivalent to 350 ppm sulfur in gasoline.

The test procedure consisted in passing the feed gas through the catalyst bed at a gas hourly space velocity of 138,000, measuring $NO_x$ conversion at about 1,000° F. (which generally gives 100% conversion), then at successively lower temperatures so as to bracket the 50 percent conversion temperature and obtain temperature coefficients. From this the 50 percent and 90 percent conversion temperatures were calculated, based on the first order rate equation. Efficiency of conversion to nitrogen was determined at 1000° F. ("Efficiency" refers to the selectivity of conversion to nitrogen times the overall conversion of NO. "Selectivity" is the percent of NO converted which was converted to nitrogen.) The results of the runs were as follows:

Table 1

| Catalyst | 90% $NO_x$ Conv. Temp., ° F. | 50% $NO_x$ Conv. Temp., ° F. | % Efficiency at 1000° F |
|---|---|---|---|
| 1. Rh | 800 | 465 | 73 |
| 2. Rh-Ni | 750 | 465 | 87 |

The foregoing data show that both catalysts are highly active for $NO_x$ conversion, while the Rh-Ni combination is superior from the standpoint of efficiency of conversion to nitrogen.

EXAMPLE VI-VIII

For purposes of comparing the relative activity and resistance to lead poisoning of analogous Rh-Ni, Pt-Ni and Pd-Ni catalysts, three monolith catalysts were prepared. The base for each catalyst was an American Lava cordierite support, AlSiMag 795, of the stacked corrugated type, upon which was deposited from an aqueous slurry a wash coat of powdered alumina and boric acid in proportions to provide about an 80/20 weight-ratio of $Al_2O_3/B_2O_3$ on the calcined supports. Each support was then dried and calcined at 1800° F. The resulting crystalline aluminum borate coating on each support amounted to about 15 weight-percent of the monolith.

Each support was then impregnated with nickel nitrate solution to provide about 5-7 weight-percent NiO on the finished monoliths, and calcined at 1500° F.

Catalyst No. 3 was prepared by impregnating one of the nickel-containing supports with a rhodium chloride solution to provide about 0.1 weight-percent of Rh on the finished monolith, and then air dried.

Catalyst No. 4 was prepared in the same manner, using a solution of platinum chloride to give about 0.1 weight-percent Pt on the finished monolith.

Catalyst No. 5 was prepared in the same manner, using a solution of palladium chloride to give about 0.1 weight-percent Pd on the finished monolith.

Each of the foregoing catalysts was then subjected to a 100 hour engine test in which they were contacted with an exhaust gas generated from a one-cylinder gasoline engine running on a fuel containing 150 ppm S and 0.05 g Pb per gallon. In these tests (which are equivalent to 5,000 miles) the engine was run alternately at idling and cruising speeds, generating exhaust gas conversion temperatures varying between about 900° and 1250° F. After the engine tests each catalyst was estimated to contain about 0.02 weight-percent of Pb.

After the engine tests each catalyst was then activity-tested with the synthetic sulfur-containing exhaust gas as described in Examples IV-V. The results were as follows:

Table 2

| Catalyst | 90% $NO_x$ Conv. Temp., ° F. | 50% $NO_x$ Conv. Temp., ° F. | % Efficiency at 1000° F. |
|---|---|---|---|
| 3. Ni-Rh | 560 | 480 | 93 |
| 4. Ni-Pt | >1500 | 1040 | 37 |
| 5. Ni-Pd | >1500 | >1500[1] | 21 |

[1]23% conversion at 1000° F.

It is readily apparent that the 100 hour engine test severely deactivated the Ni-Pt and Ni-Pd catalysts, while the Ni-Rh catalyst was still highly active. The Ni-Rh catalyst also showed a much higher efficiency than the Pt and Pd analogs. Other catalysts within the purview of this invention display a similar superiority over their platinum or palladium analogs.

The following claims and their obvious equivalents are intended to define the true scope of the invention:

I claim:

1. A catalyst composition comprising a porous crystalline aluminum borate support, and dispersed thereon a proportion of rhodium, or an oxide or sulfide or mixtures thereof, catalytically effective for the conversion of nitrogen oxides in engine exhaust gases.

2. A catalyst as defined in claim 1 wherein said aluminum borate support is in the form of granules of about one thirty-second to one-half inch in average diameter.

3. A catalyst as defined in claim 1 wherein said aluminum borate support is in the form of a monolithic honeycomb structure.

4. A catalyst as defined in claim 1 wherein said aluminum borate support is in the form of a coating applied to the channels of a relatively non-porous monolithic honeycomb structure.

5. A catalyst composition comprising a porous, crystalline aluminum borate support, and dispersed thereon about 0.005 – 0.2 weight-percent of rhodium, or an oxide or sulfide or mixtures thereof, calculated as free metal, and about 1–20 weight-percent, calculated as free metal, of nickel nickel oxide, nickel sulfide or mixtures thereof.

6. A catalyst as defined in claim 5 wherein said aluminum borate support is in the form of granules of about one thirty-second to one-half inch in average diameter.

7. A catalyst as defined in claim 5 wherein said aluminum borate support is in the form of a monolithic honeycomb structure.

8. A catalyst as defined in claim 5 wherein said aluminum borate support is in the form of a coating applied to the channels of a relatively non-porous monolithic honeycomb structure.

* * * * *